United States Patent
Wiebe et al.

(10) Patent No.: US 6,580,953 B1
(45) Date of Patent: Jun. 17, 2003

(54) ELECTRICAL CONTROL APPARATUS INCLUDING RETRIEVABLE STORED OPERATIONING PROGRAM

(75) Inventors: Cory James Wiebe, Winnipeg (CA); Mark Charles Poole, Winnipeg (CA); Kelly James Moore, Winnipeg (CA); Michael Anton Kuusela, Winnipeg (CA)

(73) Assignee: Vansco Electronics Ltd., Winnipeg (CA)

( * ) Notice: Subject to any disclaimer, the term of this patent is extended or adjusted under 35 U.S.C. 154(b) by 263 days.

(21) Appl. No.: 09/593,771

(22) Filed: Jun. 14, 2000

(51) Int. Cl.7 ............................................. G05B 19/42
(52) U.S. Cl. .............................. 700/86; 700/18; 700/26; 700/17; 700/23; 700/53; 700/87; 701/24; 701/57; 701/58; 701/68; 701/69
(58) Field of Search .............................. 700/23–26, 2–5, 700/32, 17–20, 52–53, 67, 73, 74, 40, 83–86; 701/24, 57, 58, 59, 60, 68, 69

(56) References Cited

U.S. PATENT DOCUMENTS

| | | | | |
|---|---|---|---|---|
| 4,455,621 A | * | 6/1984 | Pelley et al. | 700/25 |
| 4,700,316 A | * | 10/1987 | Nair | 700/86 |
| 4,843,557 A | * | 6/1989 | Ina et al. | 340/459 |
| 4,868,761 A | * | 9/1989 | Hayashi | 700/182 |
| 4,984,176 A | * | 1/1991 | Van den Heuvel | 706/46 |
| 5,375,250 A | * | 12/1994 | Van den Heuvel | 706/41 |
| 5,394,347 A | * | 2/1995 | Kita et al. | 700/86 |
| 5,590,362 A | * | 12/1996 | Baum et al. | 707/4 |
| 5,848,365 A | * | 12/1998 | Coverdill | 701/33 |
| 6,445,963 B1 | * | 9/2002 | Blevins et al. | 700/19 |

* cited by examiner

Primary Examiner—Ramesh Patel
(74) Attorney, Agent, or Firm—Adrian D. Battison; Michael R. Williams; Ryan W. Dupuis

(57) ABSTRACT

An electrical control system for vehicles has a plurality of separate control modules which communicate via a communication bus and an operational program is installed in each of the modules so that all modules contain programming for the functions of each module. A programming and diagnostic system including a PC and a program connects into the bus so as to download the program from one of the modules for generating, modifying and viewing program logic steps using ladder logic which is then converted back Into an operating program format for communication to the modules. In addition, the status of the inputs and outputs of the modules of the apparatus can be displayed and forced using the programming and diagnostic system.

20 Claims, 4 Drawing Sheets

ELECTRICAL CONTROL APPARATUS INCLUDING RETRIEVABLE STORED OPERATIONING PROGRAM

This application is related to and includes subject matter disclosed in U.S. application Ser. No.: 09/400,828 filed Sep. 21, 1999, now U.S. Pat. No. 6,501,368, which corresponds to Canadian application, Serial No.: 2,282,881 filed Sep. 20, 1999.

This invention relates to an electrical control apparatus for use controlling equipment such as a vehicle and particularly to an arrangement which allows a programming and diagnostic system to cooperate with the control apparatus without the necessity of storing the programs of different variations of the apparatus.

BACKGROUND OF THE INVENTION

Control apparatus for controlling electrical systems for various end uses are well known and widely required. The present invention is particularly but not exclusively concerned with such control apparatus for use in vehicles such as trucks, trains, boats, aircraft and passenger transit vehicles. However devices of this type can also be used for controlling industrial processes.

A vehicle such as a passenger transit vehicle has a large number of electrical inputs from operator actuated switches and from various other transducers such as temperature sensors and door closure switches. The vehicle further has a large number of electrical outputs where various components such as lighting, air conditioning, door actuators and engine control systems require output at a predetermined voltage from the power system of the vehicle.

One conventional arrangement for controlling the various outputs from the various inputs includes a plurality of control modules which are interconnected by a communication bus.

Each module has a series of input terminals for receiving control signals from a selected combination of the various inputs of the system. Each module has a plurality of outputs for supplying output voltage to selected ones of the series of controlled elements of the system. Each module has a plurality of switches which can be actuated to supply output as required to one or more of the output terminals. The switches are controlled by a processor in the module. The switches are preferably electronic but other electromechanical switches can be used in some cases. The module has a communications connection for two way communication between the processor and the communication bus so that the status of the module can be communicated onto the communication bus and so that information concerning the other modules can be communicated from the communication bus to the processor.

One major advantage of this type of control is that it can be used to tailor the operation to different requirements of a particular customer in order to effect control over different configurations of the controlled elements and using different inputs and different logical operations based upon those inputs. Thus in the example of the vehicle, different customers may have different options such as destination boards or wheelchair ramps on their vehicle which need to be controlled and may require certain components such as head lights of the vehicle to be operated differently based upon different inputs.

While the module arrangement described herein allows such variations to be readily adopted and implemented by the manufacturer at the customer request, it provides the significant difficulty that this leads to many different module arrangements over different customers and different manufacturing years and models so that it may be difficult to determine which module arrangement is used upon a particular vehicle.

SUMMARY OF THE INVENTION

It is one object of the present invention therefore to provide an improved electrical control apparatus with ready determination of the configuration of the apparatus for diagnostic and repair processes.

According to one aspect of the invention there is provided an electrical control apparatus comprising:

at least one control module having:
    a plurality of input terminals each arranged for receiving at least one input from a respective one of a plurality of sources of input signals;
    a plurality of output terminals arranged for connection to a respective one of a plurality of controlled elements;
    a plurality of switches each associated with a respective one of the output terminals for effecting control of the respective controlled element;
    a processor arranged so as to actuate the switches in response to data from the input terminals in accordance with a predetermined program stored in the module;
    a communications port for communication of data to and from the processor;
    the program including a set of logic steps in an operating program format by which the switches are actuated in dependence upon predetermined characteristics of one or more of the input signals;
and a programming and diagnostic system having
    a communications port for communication with the processor through the communications port of the control module;
    an operator interface for displaying data to the operator and for receiving commands from the operator;
    the control module being arranged, on receipt of a command from the operator through the programming and diagnostic system, to output the set of logic steps in operating program to the programming and diagnostic system;
    and the programming and diagnostic system being arranged to receive the set of logic steps, to convert the set of logic steps from the operating program format into an operator viewable graphic display and to display the graphic display of the logic steps on the operator interface.

Preferably the programming and diagnostic system is arranged to allow the operator to generate the set of logic steps in the operator viewable graphic display, to convert the operator viewable graphic display of the generated logic steps into the operating program format and to transmit the generated logic steps in the operating program to the control module for storage therein.

Preferably the programming and diagnostic system is arranged to allow the operator to modify the set of logic steps in the operator viewable graphic display, to convert the operator viewable graphic display of the modified logic steps into the operating program format and to transmit the modified operating program to the control module for storage therein.

Preferably the operator viewable graphic display is in ladder logic format.

Preferably the programming and diagnostic system is arranged to provide a diagnostic function by monitoring the status of the inputs and outputs.

Preferably the programming and diagnostic system is arranged to provide a diagnostic function by allowing the operator to effect forcing the status of the inputs and outputs.

Preferably the set of logic steps in operating program format is compressed relative to the operator viewable graphic display.

Preferably the operating program contains boolean equations in reverse polish notation.

Preferably the operating program has been reduced through short hand writing of the terms and using file position for identification.

Preferably the conversion of the viewable graphic display to the operating program format is done via reduction through predefined configurations of symbols such as AND, OR, NOT.

Preferably the conversion of the operating program to the viewable graphic display is achieved through predefined configurations (placement and interconnection) for symbols in AND, OR, NOT, etc. arrangements.

Preferably the initialization section of the operating program contains the initialization for properties of the parameters contained in the program such as the time to linearly ramp to full output a control module output (soft start time), telltale ownership, timer initialization, etc.

Preferably there is provided a communication bus and a plurality of separate control modules and wherein the communications port is arranged for connection to the communication bus for transmitting communications on and receiving communications from the bus.

Preferably the modules each have a different function such that each receives input from a different one or more of the sources of input data and each effects control of a different one or more of the controlled elements and wherein said predetermined program is the same in each of the modules and includes a base program and an operating program portion having respective sub-portions thereof with each sub-portion arranged to control the function of the respective module in which the program is stored.

Preferably the modules and the predetermined program therein are arranged such that, at a predetermined condition of the apparatus, the processor of each module emits to the communication bus a signal indicative of the operating program portion stored in the respective module, such that there is effected a comparison of the emitted signals, and such that, in the event that the emitted signal of one of the modules is different from that of the others, a selected one of the others is arranged to download the operating program portion from said selected one to said different one.

Preferably the control apparatus is provided in a vehicle for controlling electrical components of the vehicle.

A method of electrical control comprising:

providing a least one control module;

providing a plurality of input terminals each arranged for receiving at least one input from a respective one of a plurality of sources of input signals;

providing a plurality of output terminals arranged for connection to a respective one of a plurality of controlled elements;

providing a plurality of switches each associated with a respective one of the output terminals for effecting control of the respective controlled element;

providing a processor and causing the processor to actuate the switches in response to data from the input terminals in accordance with a predetermined program stored in the module;

providing a communications port for communication of data to and from the processor;

providing in the program a set of logic steps in an operating program format and causing the program to actuate the switches in dependence upon predetermined characteristics of one or more of the input signals;

providing a programming and diagnostic system;

providing in the system a communications port for communication with the processor through the communications port of the control module;

providing in the system an operator interface for displaying data to the operator and for receiving commands from the operator;

causing the control module, on receipt of a command from the operator through the programming and diagnostic system, to output the set of logic steps in operating program to the programming and diagnostic system;

and causing the programming and diagnostic system to receive the set of logic steps, to convert the set of logic steps from the operating program format into an operator viewable graphic display and to display the graphic display of the logic steps on the operator interface.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION OF PREFERRED EMBODIMENTS

Figure 1:
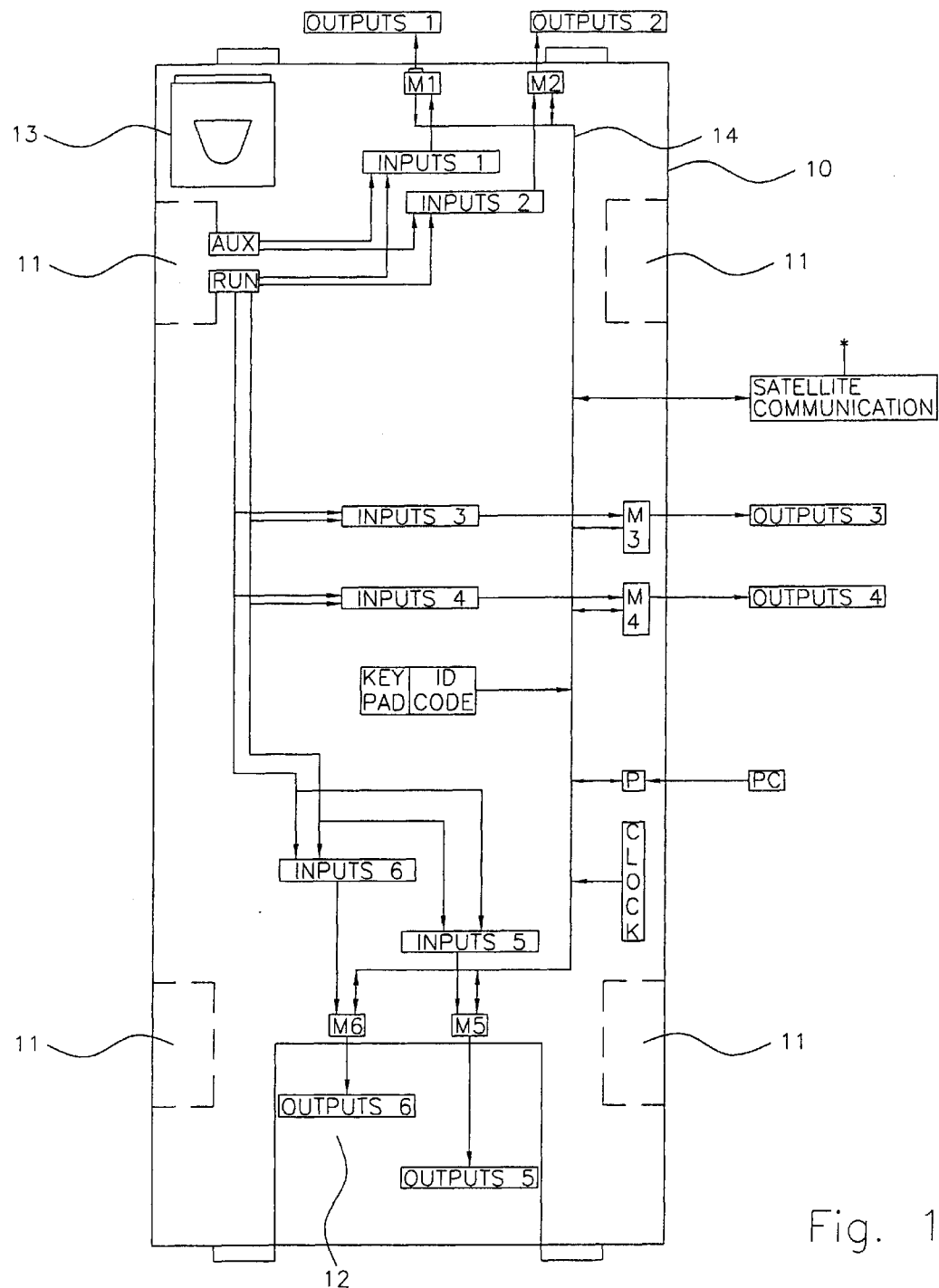
FIG. 1 is a schematic illustration of the control apparatus according to the present invention including a plurality of separate modules.

In FIG. 1 is shown a vehicle 10 having ground wheels 11, an engine compartment 12 containing an engine system (not shown) and an operator station 13 at which an operator is seated for controlling the vehicle in its various functions. All these elements are shown schematically since the details of these elements are well known to one skilled in the art.

The electrical system for controlling the vehicle comprises a communication bus 14 which runs through the vehicle from a forward position through to a rearward position. The system further includes a plurality of individual control modules M1, M2, M3, M4, M5 and M6. Each of these is connected to the communication bus by an individual connection communicating from the communication bus to a terminal on the module allowing two way communication between the module and the bus.

Each module has associated with it a series of inputs which are indicated at input 1 through input 6. It will be appreciated that this is a schematic illustration of a plurality of inputs defined by the combination of all of the inputs 1 through 6 and that each module has associated with it a selected group of the total number of inputs. The inputs comprise various different components of the vehicle including manually operable switches, transducers and sensors which are well known to one skilled in the art and therefore will not be described in detail.

Two of the inputs are indicated at AUX and RUN respectively and these are of course well known in a vehicle and relate to the ignition system by which the operator can switch the ignition to either a run condition or the AUX condition which thus activates many components of the system. These inputs form one of the inputs of each of the input combinations input 1 through input 6 and therefore each is communicated to the respective module as an input through that particular module. It will be appreciated therefore that some of the inputs are common to all of the modules and some of the inputs are individual to only one of the modules or one or two of the modules depending upon the design of the system and the functions to be effected. The AUX or RUN conditions are of course highly significant in the operation of the system and therefore are used as inputs to each of the modules. In some designs, the AUX and RUN inputs can be replaced by a single input generally known as MASTERPOWER, wherein the power is activated in all conditions of operation by the MASTERPOWER input and a separate switch is used for actuating the starter motor.

The modules are designed so that they are in a power-on condition only when one or more of a selected number of the inputs therefore are in the on condition. Thus some of the modules may shut down to a power-off or power-save condition when there is no input to the module on the selected number of inputs. In order to ensure that all of the modules are in the power-on condition when either AUX or RUN or MASTERPOWER is selected, these inputs are supplied to each of the modules as one of the selected ones of the modules. Thus the selection of AUX or RUN ensures that all modules are in the power-on condition. When neither AUX or RUN is selected, other inputs to selected ones of the modules will drive the respective module into the power-on condition while others, which are not receiving the power-on input conditions remain in the power-save condition with no outputs.

Each module drives a plurality of outputs indicated at output 1 through 6 respectively. Thus the total number of outputs required is the total of all of the outputs 1 through 6 and each module is selected to drive a predetermined combination of those outputs depending upon the design of the system.

The system further includes a programming port P which communicates with the communication bus at a suitable location thereon for receiving programming port from the programming and diagnostic system which may be a PC as indicated at PC.

Figure 2:
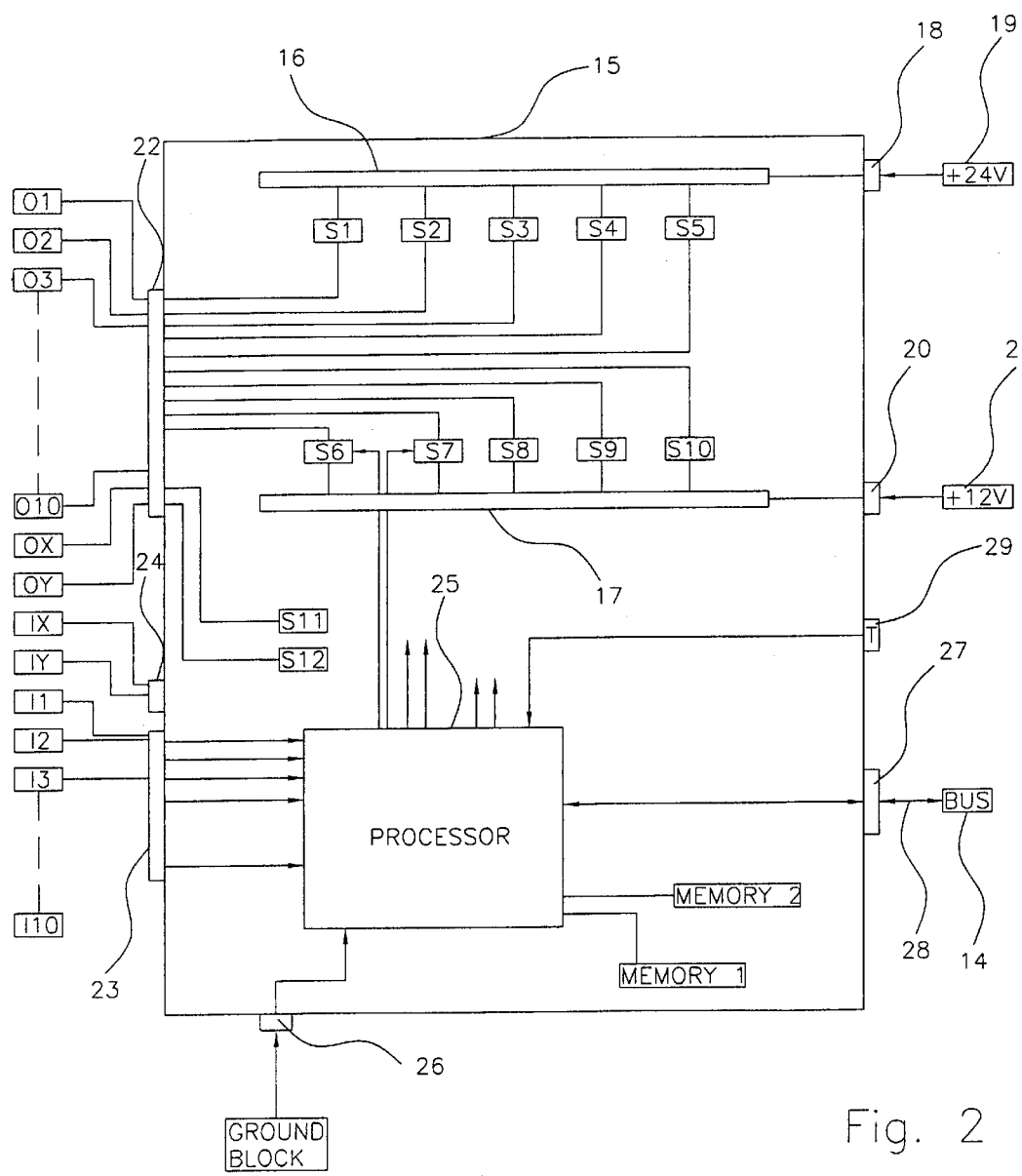
FIG. 2 is a schematic illustration of one of the modules.

Turning now to FIG. 2, the structure of each module is shown in combination with the elements associated with that module. Thus the module comprises a housing 15 which contains the module components and supports a plurality of terminals on the exterior surface of the housing for connection to the various inputs and outputs as described hereinafter.

The module includes a first power bar 16 and a second power bar 17. The first power bar is connected through an electrical connection to an input terminal 18 for receiving either 24 volts DC power from a source 19 on the vehicle or 12 volts DC from a source 21. The second power bar is connected to a terminal 20 for receiving either 24 volts DC from the source 19 or 12 volts DC power from the source 21. Thus each module may be used to supply only one of the available voltages or may be used to supply both voltages depending upon system requirements.

The power bar 16 is connected to a plurality of electronic switches S1 through S5 each of which controls communication of voltage from the supply 19 to a respective connector of an output terminal 22. The power bar 17 is connected to a plurality of switches S6 through S10 and again each of these controls supply of voltage from the source 21 to a respective connector of the terminal 22. The switches are preferably electronic but other electromechanical switches can be used in some cases. The number of switches can of course vary with requirements.

The terminal 22 provides therefore connectors for connection to selected outputs O1 through O10 which can be any component of the vehicle requiring at the set voltage and thus, depending upon the design of the system, the connector to the terminal 22 can be connected to selected vehicle components for supplying the necessary voltage thereto for operating the components as required.

The module further includes a terminal 23 which has a plurality of connectors each for connecting to a respective one of the inputs from the combination of inputs to that module, the inputs being indicated at I1 through I10. As set forth above, according to the design of the system, selected ones of the inputs I1 through I10 are arranged for connection to various input components of the vehicle of the system and thus provide an input to the module.

The module further includes a terminal 24 for connection to inputs IX and IY. These inputs are connected to switches S11 and S12 which can be actuated to supply the respective input to a respective output connector of the terminal 22 for connection to outputs OX and OY. Thus the module can be used not only to control the supply of high side voltage, that is a positive voltage line to the outputs O1 through O10 but in addition the module can be used to supply a required output to outputs OX and OY which can be low voltage connections or can be low side ground connections depending upon design requirements. The necessary output is thus applied at the selected input IX or IY and is controlled by the switch S11 or S12 as required. The switches S11 and S12 are both bidirectional for this purpose.

The module further includes a processor 25 which has a connection to the input terminal 23 so as to receive the inputs I1 through I10 as control inputs thereto. The processor further is connected to a terminal 26 which provides an input indicating to the processor which of the module functions M1 through M6 this particular is intended to carry out. One technique for the input from the terminal 26 is to provide a ground block which connects selected ones of a plurality of connectors of the processor to ground so that the particular ground connectors are selected in dependence upon the module location M1 through M6 to provide the required indication to the processor 25.

The processor 25 further connects to a terminal 27 communicating with the communication bus 14 through a connector 28. Thus the processor can provide two way communication to and from the communication bus.

The processor contains programming information including a base program stored in a memory 1 and an operating program stored in memory 2. These memory components are shown separately and schematically for convenience of illustration but it will be appreciated that in many cases the memory component will comprise a single memory chip where the base program and the operating program are stored as separate parts on the memory chip.

The system operates by providing a program in the operational program memory 2 which contains a series of separate sections each defining the function for a respective one of the modules so that each module as programmed with the operational program can carry out the function of each of the other modules. The processor receives the input from the terminal 26 to identify which module performs the respective program.

The inputs according to the design system to which the program has been created are attached at the input terminals 23 so as to provide the necessary inputs to the processor. The outputs are connected in accordance with the design arrangement so as to receive the required output from the required source.

During normal operation, each processor is activated into a power-on situation by the provision of an input to a selected number, for example inputs I1 to I5, of the total inputs I1 through I10 as determined by the hardware. Thus those modules required at any predetermined condition of the system are activated.

Each module is arranged so that the processor thereof communicates onto the communication bus data defining the current status of each of the inputs and each of the outputs of that module whenever there is a change of status.

The processor of each module thus receives the data on the communication bus and therefore has in an operating portion of the memory a current indication of the status of each of the other modules.

This data is used in conjunction with the inputs to that module from the inputs I1 through I10 under control of the designed operational program to actuate the switches S1 through S10 and thus determine the outputs. It will be appreciated that the program can be designed for various different characteristics of the system including many different arrangements of input and output. The program can be arranged to incorporated data from a number of the modules in actuating a particular output of a particular module. The program can be used to utilize a single input to one of the modules to actuate outputs at one or more of the other modules. The program can be used to generate feedback so that a sensor responsive to actuation by a certain output provides data for the communication bus which is fed back so that it is subsequent actuation only occurs if the first actuation has completed successfully. The program can be arranged to receive data from other elements connected to the communication bus and supplying status data to the bus, such as the engine control system, and to use that data in actuating selected outputs of the modules.

Figure 3:
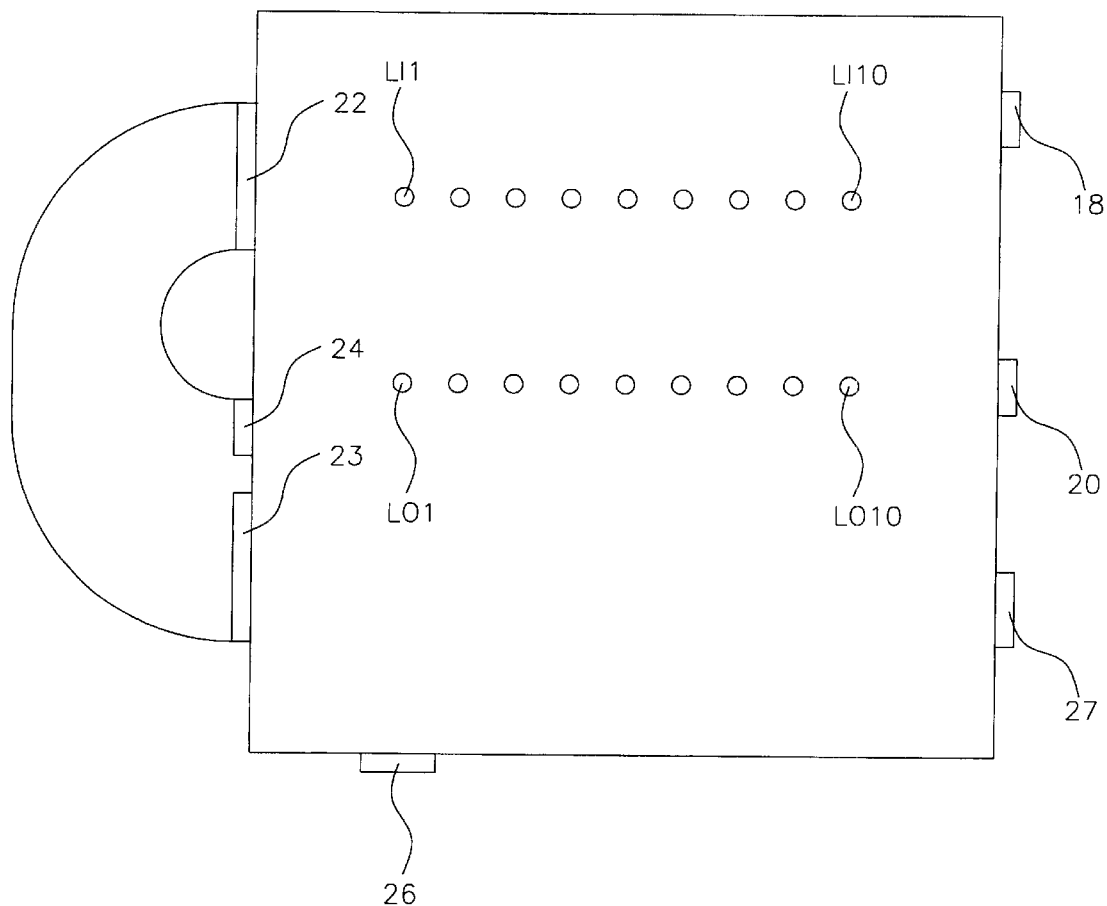
FIG. 3 is a schematic illustration of the exterior of the housing showing the status LEDs and a feedback harness for diagnostics.

As shown in FIG. 3, each module include two series of status LEDs for indicating to service technicians the operation of the modules. Thus the input connectors of the input terminal are associated with individual LEDs LI1 to LI10 of one series of the status LEDs which are arranged to be on when an input is present and off when no input is present. Each output connector is associated with a respective one of the second series of LEDs LO1 to LO10 to indicate the status of the respective output. Each LED is arranged to be on when an output is present, to be off when no output is present and to flash when a fault, such as a short or overload, is detected. This two series of status LEDs can be used with a feed back harness H to check the proper operation of the module. Thus a feedback harness is provided which allows a connection from each output to a respective one of the inputs. In the event that there are more inputs than outputs, or vice versa, connections can be doubled so that one output is connected to two inputs. The program is then actuated to run a diagnostic mode in which each output is actuated, to generate a respective input, and then to generate an output if each input is present. In such a situation, all status LEDs should be on and if they are not then a fault is present.

The modules are supplied in an initial condition in which the base program in memory 1 is installed and therefore enables the processor to carry out initial programming functions but does not enable the processor to carry out the necessary control of the outputs in dependence upon the operational program since that is not present.

The absence of the operational program therefore allows the module to be generic without dedication to a particular operational program. The module can therefore be re-programmed for different systems and schemes of operation to accommodate modifications over an extended life of manufacture of a particular product or various differences due to selection of particular options in the product.

It will be appreciated that the basic program includes a conventional communication protocol such as CAN which controls the operation and communication between the elements of the system.

In the event of initial installation of all of the modules, the modules are initially installed from the supply in the condition with the operational program omitted. When installed and connected as required, the necessary programming is applied to the communication bus for communication to each of the modules through the port P from the programming and diagnostic system PC. The program is therefore supplied into the memory using conventional programming techniques of data are supplied to be led into the memory of each processor together with a check sum and each processor in turn confirms by returning the check sum that the program portion has been properly installed. While usually the operational program is omitted, it is possible that another program will be already in place in one or more of the modules depending upon their source in which case the existing program is overwritten or replaced by the new programming relevant to the new situation.

As previously described, each module has the input from the terminal 26 which identifies to that module which function that module is intended to perform thus allowing the modules to be individually addressed during the programming procedure.

In the event of replacement of a module, should that module be defective or for some other reason, the replacement module is again generally supplied in a condition from the supplier in which the operational memory is omitted thus allowing the module to be generic and applicable to a number of different models of the product concerned. In some cases a replacement module may come from another source such as a spare part already used in another vehicle in which case it will contain an existing operational program which will be incorrect for the new system and will thus need to be replaced by the programming system described herein.

While the arrangement set out herein is intended and designed to allow replacement of only one module at a time, it is also possible to generate arrangements which will allow replacement of more than one module.

The module to be replaced is removed by disconnecting the various connections to the terminals and a replacement module is inserted in its place. Of course the replacement occurs in a condition with the power to the sources 19 and 21 disconnected so that the vehicle is in a power-off condition.

After the module is installed, the power is reconnected so that the vehicle enters the power-up condition. As previously explained, in the initial power up condition it is not necessary that all of the modules are moved into the power-on condition since some may remain inactive since they are not required in the initial condition of the vehicle. However, actuation of the vehicle ignition switches to the AUX, RUN or MASTERPOWER condition, is arranged as explained before so that each module is actuated to the power on condition. In most cases it is acceptable to cause the programming procedure to run at each power-up. However, in some cases it may be desirable to prevent this occurring except in a situation where a specific arrangement of inputs is actuated by the technician wishing to cause the procedure after installation of a module, thus defining a masterlock arrangement operable by the technician.

In this initial condition, when each module detects the AUX, RUN or MASTERPOWER input, the basic program is arranged, after running the conventional protocol for initial addressing, to cause each module to emit onto the communication bus a reference or identification number which forms part of the operating program together with an optional check sum calculated from the operating program.

The reference number forms part of the operational program and identifies the particular design of system used in this particular vehicle depending upon its time of manufacture and depending upon the option selected.

The base program of each of the processors causes the processors to receive the information emitted onto the communication bus by each of the modules. Since the replacement module does not contain the operational program. Any data transmitted by that module, from an existing operational program if any, likely does not contain the correct reference number nor the correct check sum since this has not been programmed into the module. The modules under the control of the base program thus compare the data emitted and a determination is made as to whether all are accurate and proper or whether one is inaccurate.

In the condition set forth above where the process of comparison of the reference numerals occurs at each power-up with the ignition in the AUX or RUN condition, in most cases the modules will determine that each of the modules contains the correct and accurate program.

However in the event that one of the modules becomes defective or is replaced and therefore does not contain the proper operational program, that module will emit to the communication bus a reference number and check sum which are inaccurate, that is different from those of the other modules. In this case, the base program is arranged to designate one of the modules to download from its memory the operation program onto the communication bus for loading into the replacement module.

Programming is carried out using conventional programming techniques so that each program portion is communicated with a check sum and the receiving module replies to confirm proper receipt by transmitting a calculated reply check sum.

The system therefore allows a generic module which is generic to a number of different designs of system to be installed subsequent to the initial programming at any time during the life of the vehicle and the system automatically programs the module so that it receives from the designated one of the modules the necessary operational program so that the modules can then commence operation in the normal operating manner.

Preferably the designated module is the module with the lowest number designation which would be module M1. In the event that module M1 is the replacement module, the base program is programmed to cause the next module which is module M2 to effect the downloading for programming the replacement module M1.

In order to avoid the necessity for the procedure of checking to be carried out at each power-up when no modules have been replaced, the system may be arranged so that an operator actuates a predetermined arrangement of inputs and only when these inputs are operational does the check program run.

Turning now to the programming and diagnostic system PC, this includes a conventional graphic display allowing the operator to view the programming as described hereinafter. The PC is programed with Software which is designed to program, control and diagnose the control modules of the control apparatus individually or when installed as a complete system. The Software is designed to communicate through a standard PC serial communication port through an adapter link to the communications bus 14 using a standard protocol such as the SAE J1939 protocol on the vehicle. The Software receives/sends messages to/from the modules connected on the bus.

The Software has two main functions:

1. Drawing/Programming Tool:

This allows drawing of system ladder logic and downloading/uploading of logic to/from the modules connected in the system.

2. Diagnostics Tool:

This allows real time viewing of system operations using ladder logic and virtual front panel views.

In a typical multiplexed solution, the control modules are programmed to implement specific features, or interface with unique characteristics of input and output devices. Each different vehicle (system) version will have different programming, each created from different source code or program in operating format. If a customer has many different vehicles, equipped slightly differently, it is very difficult to keep track of the programming contained each vehicle. As well, if a vehicle requires repair or service at a remote location, the service person would need access to the programming source code in order to diagnose the vehicle problems.

When the system functionality is being designed, easy-to-use Windows-based graphical tools are used to describe the logic for each module function. These tools create a program file, which is downloaded, into each module in the system. Later, when servicing is needed, or programming is to be changed, the module program file can be extracted from the module, and edited using the original graphical tools. It is not necessary for the source code to be obtained from the original design office, or from a central library as the modules themselves contain the source code.

The program has the following Features:

Windows 95, 98, NT Application written in C++.

Menu-driven Graphical User Interface

Password protected.

Multi-tiered security access.

CAD interface for creating/editing Ladder Logic

Automated Error Checking of Ladder Logic designs

Automated Compiling of Ladder Logic designs into operating formatted ladder logic file.

Automated graphical ladder logic drawing from operating formatted ladder logic file.

Advanced Ladder Logic Operations such as customizable J1939 Messaging, Math Functions, and Timers.

Advanced Edit functions for Ladder Logic designing such as Cut, Paste, Copy, Delete, Undo, and Redo.

Advanced Search functions such as Find and Find Replace.

Error Logging and Viewing of both module and software logs

Upload/Download of Ladder Logic Design to/from the modules.

Download of Application Firmware to the modules

Diagnostics—Real Time status updates of inputs, outputs, telltales, flags, timers, etc.

Diagnostics—Forcing of inputs, outputs, telltales, flags, timers, etc.

Online/context sensitive help

Figure 4:
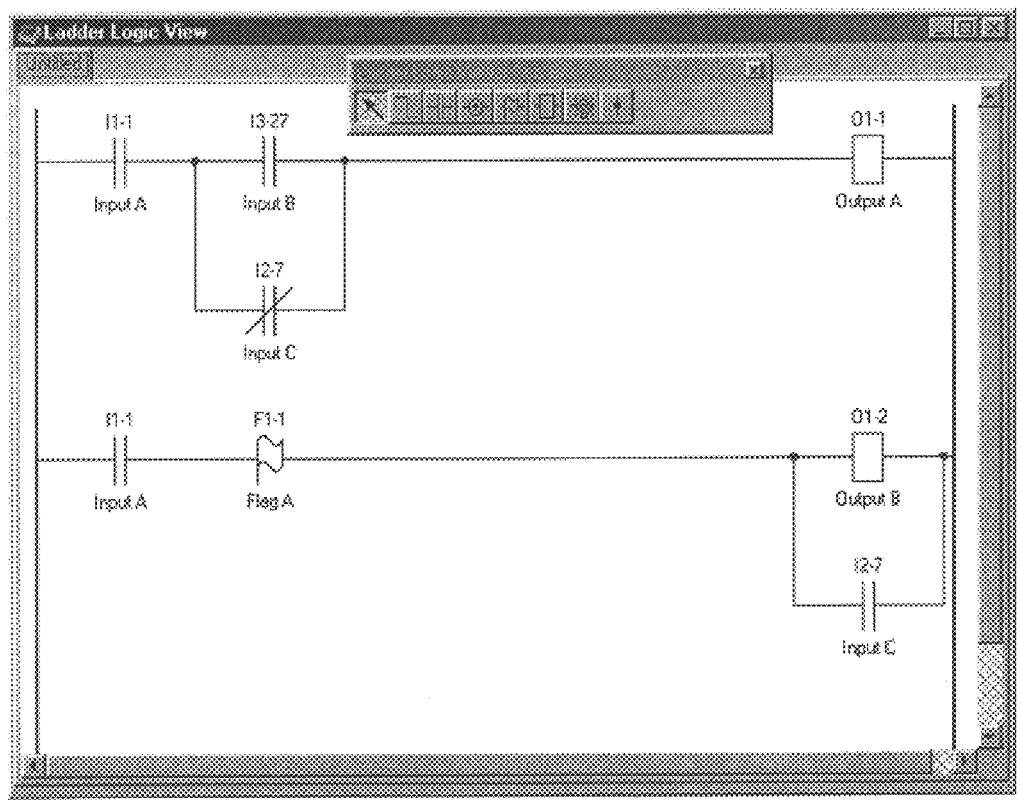
FIG. 4 is a view of the graphic display of the program components in ladder logic format.
Figure 4:
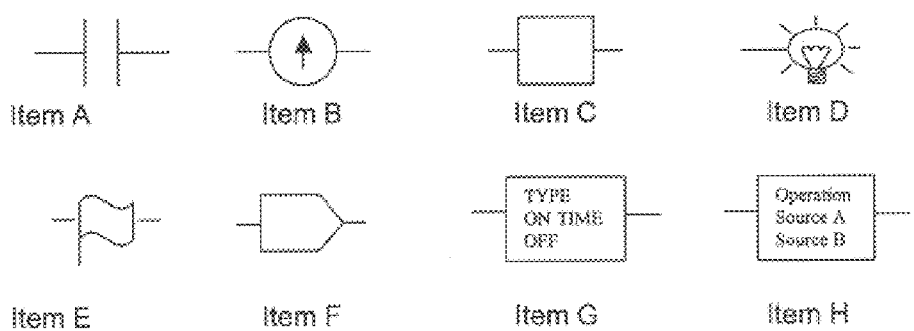

Ladder logic is a conventional graphical view of standard Boolean logic (AND, OR, NOT, etc). It was developed to provide a simple method of writing and reading complex logic. Ladder logic uses geometric symbols to represent certain aspects of the system being programmed, for example module inputs would be represented by a symbol and module outputs would be represented by a symbol. The placement of these symbols and the way they are.interconnected creates Boolean operations. Ladder Logic is so named because the logic is drawn in "rungs" where one rung represents the logic to activate/deactivate a specific output in the system. Each symbol has several fields associated with it that the user can alter, these fields define certain required aspects of a symbol. A list of symbols available in the Software is shown below:

1. Digital inputs into module input circuits as shown in FIG. 4, Item A. There are three user changeable fields associated with this symbol: Name, Label State, and Active High/Low.

2. Analog inputs into the module analog input circuits as shown in FIG. 4, Item B. There are four user changeable fields associated with this symbol: Name, Label, Threshold and State.

3. Output connected to the module output circuits as shown in FIG. 4, Item C. There are five user changeable fields associated with this symbol: Name, Label, Description, State, and Soft Start. Outputs can be used as rung terminators or as inputs. When used as terminators, the state field is not available, when used as inputs only Name, Label and State are available.

4. A special type of output which sends J1939 messages to Telltale clusters for turning on/off dash telltale lights as shown in FIG. 4, Item D. There are four user changeable fields associated with this symbol: Name, Label, Flash and Description. Outputs can be used as rung terminators or as inputs. When used as terminators, the state field is not available, when used as inputs only Name, Label and State are available.

5. A logical output as shown in FIG. 4, Item E.

This output doesn't physically turn a module output on/off, it sets a memory location to true or false. This memory location, or flag, can then be used as an input condition on other rungs in any module. It is typically used to simplify ladder logic drawings for repetitive logic.

There are four user changeable fields associated with this symbol: Name, Label, Description and State. Outputs can be used as rung terminators or as inputs. When used as terminators, the state field is not available, when used as inputs only Name, Label and State are available.

6. Message input for communication from the bus as shown in FIG. 4, Item F. Messages typically have one or more data bytes for which a Threshold value can be set to determine symbol state (similar to an analog input symbol).

There are three user changeable fields associated with this symbol: Name, Label and Threshold.

7. A message transmission output on the bus as shown in FIG. 4, Item F. This allows a module to send specific messages. This is a terminator symbol for a Ladder Logic Rung.

There are four user changeable fields associated with this symbol: Name, Label, Message and Description.

8. A timer in a ladder logic rung as shown in FIG. 4, Item G.

This symbol is used to create delay on make, delay on break, one shot or periodic timing operations. The timer type and time values are displayed within the symbol box.

There are four user changeable fields associated with this symbol: Name, Label, Type, On Time and Off Time.

9. A mathematical calculation or storage operation on a specified source as shown in FIG. 4, Item H. Valid sources include analog inputs, values from message inputs, direct value, etc. Operation and source text appears inside the symbol box. Valid operations include Add, Subtract, Multiply, Divide and Move.

There are four user changeable fields associated with this symbol: Label, Operation, Source A and Source B.

The fields in the symbols above are required to give the control apparatus and the operator programming or diagnosing the control apparatus more information on what the symbol or parameter is. A list of all fields and their functions is shown below.

NAME:

The NAME field tells the system what module address and what input or output number the symbol represents. For example, Ix-y is the name field for I (Input) # y on module address x. A similar scheme is used for the other symbols.

LABELS

The LABEL field provides the user with a field for custom labels on the symbol (Ex. "Park Brake Sw" for the input that receives the park brake sensor). The LABEL field is standard text and can contain any description required by the user. The LABEL field is the same for all symbols above.

STATE

The STATE field provides the user with two options, ACTIVE and INACTIVE. When ACTIVE is selected the symbol appears as it does in the pictures above, when INACTIVE is selected, the symbol appears with a diagonal line through it. The STATE field provides the user with a Boolean NOT function. For example, if a Digital Input's STATE field is set to INACTIVE the Digital Input becomes TRUE when the physical value of the input is inactive.

DESCRIPTION

This is a text field and is intended to be used as a rung descriptor.

THRESHOLD

The THRESHOLD field is available on Analog Inputs and Receive Messages. The THRESHOLD value is set such that if the Analog Input or Message Data Value is greater than the THRESHOLD, that symbol becomes TRUE in the logic. Note that for analog inputs a STATE field is available as well which reverses the logic of the THRESHOLD value.

MESSAGE

The MESSAGE field is specific to the Transmit Output symbol and contains the full message to be transmitted.

TYPE

The TYPE field is specific to the Timer Symbol and can be set to DELAY ON MAKE, DELAY ON BREAK, ONE SHOT, PERIODIC.

ON TIME

The ON TIME field is specific to the Timer Symbol and sets the length of time (in milliseconds) that the timer is to stay on for. The ON TIME field must be set for all TYPEs selected.

OFF TIME

The OFF TIME field is specific to the Timer Symbol and sets the length of time (in milliseconds) that the timer is to stay off for. This field is only used in conjunction with the PERIODIC TYPE field and the ON TIME field. The frequency and duty cycle are defined by the ON TIME and OFF TIME of the symbol.

OPERATION

The OPERATION field is specific to the Math Symbol. This field selects the type of mathematical operation that is to be done on the two SOURCE fields. Valid selections for this field are ADD, SUBTRACT, MULTIPLY, DIVIDE, MOVE.

SOURCE A

The SOURCE A field is specific to the Math Symbol. In order to do a mathematical operation such as add, subtract, multiply or divide, two sources are required. SOURCE A defines what the first source for the operation is. Valid sources are Analog Inputs, Message Data or direct values (or numbers). SOURCE A is also the receiving end of the result of the operation.

SOURCE B

The SOURCE B field is specific to the Math Symbol. This defines the second source that is to mathematically calculated with SOURCE A. This field is required for all Mathematical functions.

PWM DUTY CYCLE

The PWM DUTY CYCLE field is used to specify the PWM value for a VMM output. PWM can be done from 0% to 100% in 1% increments. The frequency of PWM operation is 100 Hz. A setting of 100% in this field is the default for output symbols and sets the output on constantly.

SOFTSTART

The Softstart field is used to specify the delay value for a softstart output. The softstart field gives the ability to the output to slowly ramp up the voltage on it's output over a specified period of time, until the output has reached it's full voltage.

The drawing/programing tool offers a Graphical User Interface (GUI) under Windows 95/98 operating systems in which ladder logic symbols can be placed and interconnected to represent vehicle logic. FIG. 4 is a screen shot of the Ladder Logic Editor.

This screen shot shows the GUI interface that displays the ladder logic rungs for the system. The screen has two rungs displayed, the first rung displays the logic required to activate O1-1 (module 1, output 1). The second rung displays the logic required to activate O1-2 (module 1, output 2). The inputs are numbered in a similar fashion. The equivalent Boolean equation that represents the first rung would be O1-1=I1-1 AND (I3-27 OR (NOT I2-7)). Notice that the "NOT" operation is represented by a line drawn through the ladder logic symbol that is to be inverted (this is done by setting the STATE field for that symbol to INACTIVE). Note that each symbol also displays the LABEL field where a name can be given to a symbol, for example in the screen shot above I1-1 has the LABEL "Input A". The Flag symbol in the second rung demonstrates that a flag is used just like any other input symbol. The flag itself represents a set of logic (drawn elsewhere in the ladder logic application), if the flag logic is true then the flag itself is true. Flags are typically used to simplify ladder logic drawing be encompassing repetitive logic that is used in multiple rungs.

The drawing/programming tool operates in a similar manner to many electrical schematic entry applications or standard drawing applications on the market today. The drawing area is represented in a separate window with two "terminator" bars drawn on either side. Items are placed between the terminator bars and lines for a rung start at the left.hand terminator bar and end at the right hand terminator bar. A tool bar (seen at the top of the screen shot) has a selection of all the ladder logic symbols, if you left click on a symbol type on the tool bar you can then place that symbols in the ladder logic window. The various fields can be accessed and altered by double clicking the symbol or right clicking and selecting the "Properties" item. A child window will pop up with the various field entry boxes for that specific symbol.

Symbols are interconnected using the Line Draw tool from the toolbar. This allows the user to connect the various symbols according to the logic functions required. The line draw tool will only allow vertical or horizontal lines to be drawn which simplifies the process and helps to keep the drawing neat. To start a rung, a line must be drawn from the left hand terminator bar to the first symbol in the rung. To end a rung a line must be drawn from the output symbol to the right hand terminator bar.

Output symbols that are directly connected to the right hand terminator bar are considered to be outputs in nature (i.e. the output symbol goes ACTIVE and does its thing if the logic to the left of it is TRUE). Output symbols that are not directly connected to the right hand terminator bar are considered to be inputs (i.e. the output state is used in the "logic" portion of the rung).

The tool provides several pull down menus all of which offer standard Windows operations such as OPEN, SAVE, PRINT, CUT, COPY, PASTE, etc. A list of the various menu functions are shown below.

FILE

New, Open, Save, Save As, Print, Print Preview, Page Setup, Exit

EDIT

Undo, Redo, Cut, Copy, Paste, Delete, Select All

VIEW

Ladder Logic:

This pulls up the ladder logic drawing/programming window. The ladder logic window allows the operator to generate, view and modify the set of logic steps contained in an operating program, in an operator viewable graphic display.

When the ladder logic drawing window is required to display logic steps contained in a previously created operating program file, a conversion from the program file to graphical display must take place. This is accomplished by parsing through the operating program file, converting each boolean equation contained in the file from reverse polish notation into a standard notation representation. As a boolean equation is parsed, graphical images are created for the parameters included in the equation and formatted using the information contained in the program file. The standard notation representation is then used to establish the correct location and interconnection of the parameters on the graphic display based on predefined configurations for parameters in the arrangements of AND, OR, NOT, etc. This process is repeated for all of the boolean equations contained in the operating program file.

module I/O

This pulls up the module input/output entry window

TOOLS

Diagnostic

This pulls up the diagnostic window which displays ladder logic with color codes for real time diagnostics.

Query modules

This checks the system and reports the firmware and ladder logic revision numbers for all the modules in the system queried Compile Ladder Logic This converts the graphical representation in the drawing window into a table that can be downloaded to the module system. When a compile is initiated two functions are performed: error check and compile. The error check function checks the connections of parameters to verify all parameters have their left and right sides connected. Next all the rungs in the ladder logic are check to ensure that each rung has a least one terminator and at most one terminator, where a terminator is an output that is connected directly to the right terminator bar. A verification that the left and right sides of a parameter are not connected to one another is then performed. A check to ensure that a rung is connected to both the left terminator bar and the right terminator is performed next. Subsequently a check is made to verify that all parameters with the same names have the same labels and that parameters with different names don't have the same labels. Finally all properties of all parameters are then tested for validity. The compile function, which is performed next starts with getting a list of all the rungs. Next all the parameters for the first rung in the list are found. The terminator parameter for the rung is then used as the right side of the boolean equation that is to be stored in the operating program. Next a list of arrangements of parameters representing the boolean operations of AND, OR, Not, etc are is taken and match to the configurations of the parameters in the current rung. It match reduces the rung, similar to a flag until no more reductions can be done. When only one parameter remains the compile is almost complete. The last step is to take the names of the parameters and substitute to create the boolean equation in reverse polish notation (RPN).

| Standard Notation | A&(B\|C)&(!D) |
|---|---|
| RPN | A, B, C, \|, &, D, !, & |

The boolean equation is then saved to the operating program format and the next rung in the list is then reduced until all the rungs have been reduced.

Logs

Provides a record of error that may of occurred either in communication or with the control apparatus. Also includes an Audit Log of user activity.

Download Firmware

This allows the user to program the basic program section of the control modules in the control apparatus.

Download Logic

This sends the current compiled logic displayed in the Ladder Logic Drawing window to the control apparatus.

Upload Logic

This loads the ladder logic from the control apparatus and displays it in the Ladder Logic drawing window Security This allows multi-tiered access to be assigned to users and passwords to be set for the application to prevent unauthorized use of the editing and diagnostic tools.

HELP

Contents, Index, About

The diagnostic tool provides the user with a real time view of the system while it is operating. The tool itself displays the vehicle Ladder Logic in a screen very similar to the drawing window, except editing and drawing is not allowed. The ladder logic displayed has color coding depending on the state of inputs and outputs and whether a specific module is powered or not. For example, ladder logic symbols are colored GREEN if the input or output they represent is active in the system, otherwise the symbols are colored RED. If a module is not powered up, the logic symbols are colored black to represent an unknown state.

In addition to viewing, symbols can be forced to ACTIVE or INACTIVE states. That is, a symbol representing module 1 input 1 can be forced to the ACTIVE state even if the input itself is inactive on the vehicle. The forced state overrides the actual state and allows the user to create certain conditions in the system to aid in logic and vehicle debugging. Symbols that are forced have a solid line box drawn around the symbol.

The diagnostic tool has very simple operation. Symbols within the diagnostic window can be right clicked on to bring up a popup menu to force their state ACTIVE or INACTIVE. A "panic button" is offered by right clicking and selecting ALL FORCED STATES RESET which will switch all symbols that were forced back to the value current on the vehicle.

The following provides the Ladder Logic Grammar used in the operating program file.

General:

Parameters on the same line are separated with a semicolon.

Individual parts of a parameter are separated with a comma.

Definitions:

<analog>=Analog input

<description>=Description of rung terminator

<digital>=Digital input

<flag>=Flag number

=Textual description of parameter

<output>=output

<personality revision>=Revision level of system

<personality version>=Differentiates between different systems

<RPN equation>=Comma separated list of operands and operators.

<soft start time>=Time to linearly ramp to full output.

<spn>=J1939 Suspect Parameter Number

<system name>=Name assigned to whole system

<telltale>=Telltale number

<VMM terminator>=C<timer>|F<flag>|O<output>|T<telltale>|S<spn>

<timer>=Timer number

<vmm>=Module address

Ladder Logic Operating Program File Format:

*LLF

NAME=<system name>

VERSION=<personality version>

REVISION=<personality revision>

*VMM

V<vmm>;<label>

*SYMBOLS

A<analog>;<label>

. . . -Analog

A<analog>;<label>

C<timer>;<label>

. . . -Timer

C<timer>;<label>

F<flag>;<label>

. . . -Flag

```
F<flag>;<label>
I<input>;<label>
  ... -Input
I<input>;<label>
O<output>;<label>
  ... -Output
O<output>;<label>
S<spn>;<label>
  ... -J1939 SPN
S<spn>;<label>
T<telltale>;<label>
  ... -Telltale
T<telltale>;<label>
*INIT
  TT=Y|N;HIGH=[<digital>, ... ,<digital>];OPEN=
    [<output>, ... ,<output>]
  Specifies if telltales controlled by this module, active high
    inputs, and outputs to check for open circuit.
  C<timer>;TYPE=B|M|O|P;DATA=<data>[, ... ,<data>]
  ... Delay on Break, Delay on Make, One Shot, Periodic.
    Periodic requires 2<data>fields. All other types require
    1 field.
  C<timer>;TYPE=B|M|O|P;DATA=<data>[, ... ,<data>]
  [F<flag>;INIT=0|1]
  ... Initial state of the flag (default if not specified is 0).
  [F<flag>;INIT=0|1]
  [O<output>;TIME=<soft start time>]
  ... Specifes ramp up time to control an output (0 means
    no ramp, default if not specified is 0).
  [O<output>;TIME=<soft start time>]
*LOGIC
  <VMM terminator>;<RPN equation>;<description>
  ... -See next section for RPN equations.
  <VMM terminator>;<RPN equation>;<description>
*VMM
  V<vmm>;<label>
*SYMBOLS
  A<analog>;<label>
  ... -Analog
  A<analog>;<label>
  C<timer>;<label>
  ... -Timer
  C<timer>;<label>
  F<flag>;<label>
  ... -Flag
  F<flag>;<label>
  I<input>;<label>
  ... -Input
  I<input>;<label>
  O<output>;<label>
  ... -Output
  O<output>;<label>
  S<spn>;<label>
  ... -J1939 SPN
  S<spn>;<label>
  T<telltale>;<label>
  ... -Telltale
  T<telltale>;<label>
*INIT
  TT=Y|N;HIGH=[<digital>, ... ,<digital>];OPEN=
    [<output>, ... ,<output>]
  Specifies if telltales controlled by this module, active high
    inputs, and outputs to check for open circuit.
  C<timer>;TYPE=B|M|O|P;DATA=<data>[, ... ,<data>]
  ... -Delay on Break, Delay on Make, One Shot, Periodic.
    Periodic requires 2 <data>fields. All other types require
    1 field.
  C<timer>;TYPE=B|M|O|P;DATA=<data>[, ... ,<data>]
  [F<flag>;INIT=0|1]
  ... -Initial state of the flag (default if not specified is 0).
  [F<flag>;INIT=0|1]
  [O<output>;TIME=<soft start time>]
  ... -Specifes ramp up time to control an output (0 means
    no ramp, default if not specified is 0).
  [O<output>;TIME=<soft start time>]
*LOGIC
  <VMM terminator>;<RPN equation>;<description>
  ... -See next section for RPN equations.
  <VMM terminator>;<RPN equation>;<description>
*END
RPN Equations:
Operands:
  A<vmm>-<analog>
  C<vmm>-<timer>
  F<vmm>-<flag>
  I<vmm>-<input>
  O<vmm>-<output>
  S<spn>
  Numbers (e.g. 0, 1, 100, etc.)
Operators:
```

| Operator | Function | Parameters |
|---|---|---|
| & | Logical AND | 2 |
| \| | Logical OR | 2 |
| ! | Logical NOT | 1 |
| <, > | Comparison | 2 |
| +, -, *, / | Mathematical | 2 |
| @ | Change Pulse Width Modulation for current output terminator. | 2 |

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

What is claimed is:

1. A method comprising:
   providing at least one control module having:
      a plurality of input terminals each arranged for receiving at least one input from a respective one of a plurality of sources of input signals;
      a plurality of output terminals arranged for connection to a respective one of a plurality of controlled elements;
      a plurality of switches each associated with a respective one of the output terminals for effecting control of the respective controlled element;

a processor arranged so as to actuate the switches in response to data from the input terminals in accordance with a predetermined operating program;

a communications port for communication of data to and from the processor;

the operating program including a set of logic steps in an operating program format by which the switches are actuated in dependence upon predetermined characteristics of one or more of the input signals;

the operating program being stored in the control module;

providing a personal computer having:

a communications port for communication with the processor through the communications port of the control module;

an operator interface for displaying data to the operator and for receiving commands from the operator;

providing a programming and diagnostic program in the personal computer;

on receipt of a command from the operator through the personal computer, causing the control module to output the set of logic steps in operating program format to the personal computer:

causing the personal computer to receive and store the set of logic steps;

causing the personal computer using the programming and diagnostic program to convert the set of logic steps in operating program format stored in the personal computer from the operating program format into an operator viewable graphic display in ladder logic format and to display the graphic display of the logic steps on the operator interface;

causing the personal computer using the programming and diagnostic program to allow the operator to generate and/or modify the set of logic steps stored in the personal computer and viewed in the operator viewable graphic display;

and causing the personal computer using the programming and diagnostic program to convert the operator viewable graphic display of the generated logic steps into the operating program format and to transmit the generated logic steps in the operating program format to the control module for storage therein.

2. The method according to claim 1 including providing a diagnostic function by monitoring the status of the inputs and outputs.

3. The method according to claim 1 including providing a diagnostic function by allowing the operator to effect forcing the status of the inputs and outputs.

4. The method according to claim 1 wherein the set of logic steps in operating program format is compressed relative to the operator viewable graphic display.

5. The method according to claim 4 wherein the set of logic steps in operating program format contains boolean equations in reverse polish notation.

6. The method according to claim 4 wherein the set of logic steps in operating program format is reduced through short hand writing of the terms and using file position for identification.

7. The method according to claim 4 wherein the conversion of the viewable graphic display to the set of logic steps in operating program format is done via reduction through predefined configurations of the AND, OR and NOT symbols.

8. The method according to claim 4 wherein the conversion of the set of logic steps in operating program format to the viewable graphic display is achieved through predefined configurations (placement and interconnection) for the AND, OR and NOT symbols.

9. The method according to claim 4 wherein an initialization section of the set of logic steps in operating program format contains the initialization for properties of the parameters contained in the program.

10. A method comprising:

providing a communication bus;

providing a plurality of control modules each having:

a plurality of input terminals each arranged for receiving at least one input from a respective one of a plurality of sources of input signals;

a plurality of output terminals arranged for connection to a respective one of a plurality of controlled elements;

a plurality of switches each associated with a respective one of the output terminals for effecting control of the respective controlled element;

a processor arranged so as to actuate the switches in response to data from the input terminals in accordance with a predetermined operating program;

a communications port connected to the communications bus for communication of data to and from the processor;

the operating program being stored independently in each of the control modules;

the operating program including a set of logic steps in an operating program format by which the switches are actuated in dependence upon predetermined characteristics of one or more of the input signals;

providing a personal computer having:

a communications port for communication with the processor through the communications port of the control module;

an operator interface for displaying data to the operator and for receiving commands from the operator;

providing a programming and diagnostic program in the personal computer;

on receipt of a command from the operator through the personal computer, causing one of the control modules to output the set of logic steps in operating program format to the personal computer;

causing the personal computer to receive and store the set of logic steps;

causing the personal computer using the programming and diagnostic program to convert the set of logic steps in operating program format stored in the personal computer from the operating program format into an operator viewable graphic display in ladder logic format and to display the graphic display of the logic steps on the operator interface;

causing the personal computer using the programming and diagnostic program to allow the operator to generate and/or modify the set of logic steps stored in the personal computer and viewed in the operator viewable graphic display;

and causing the personal computer using the programming and diagnostic program to convert the operator viewable graphic display of the generated logic steps into the operating program format and to transmit the generated logic steps in the operating program format to the control modules for storage therein.

11. The method according to claim 10 wherein the control modules each have a different function such that each receives input from a different one or more of the sources of input data and each effects control of a different one or more of the controlled elements and wherein said predetermined program is the same in each of the control modules and includes a base program and an operating program portion having respective sub-portions thereof with each sub-portion arranged to control the function of the respective module in which the program is stored.

12. The method according to claim 11 wherein the control modules and the predetermined program therein are arranged such that, at a predetermined condition of the apparatus, the processor of each module emits to the communication bus a signal indicative of the operating program portion stored in the respective module, such that there is effected a comparison of the emitted signals, and such that, in the event that the emitted signal of one of the modules is different from that of the others, a selected one of the others is arranged to download the operating program portion from said selected one to said different one.

13. The method according to claim 10 including providing a diagnostic function by monitoring the status of the inputs and outputs.

14. The method according to claim 10 including providing a diagnostic function by allowing the operator to effect forcing the status of the inputs and outputs.

15. The method according to claim 10 wherein the set of logic steps in operating program format is compressed relative to the operator viewable graphic display.

16. The method according to claim 15 wherein the set of logic steps in operating program format contains boolean equations in reverse polish notation.

17. The method according to claim 15 wherein the set of logic steps in operating program format is reduced through short hand writing of the terms and using file position for identification.

18. The method according to claim 15 wherein the conversion of the viewable graphic display to the set of logic steps in operating program format is done via reduction through predefined configurations of the AND, OR and NOT symbols.

19. The method according to claim 15 wherein the conversion of the set of logic steps in operating program format to the viewable graphic display is achieved through predefined placement and interconnection configuration for the AND, OR and NOT symbols.

20. A method of controlling controlled elements in a vehicle comprising:

providing a plurality of controlled elements;

providing a plurality of sources of input signals;

providing a communication bus;

providing a plurality of control modules each having:

a plurality of input terminals each arranged for receiving at least one input from a respective one of the plurality of sources of input signals;

a plurality of output terminals arranged for connection to a respective one of a plurality of the controlled elements;

a plurality of switches each associated with a respective one of the output terminals for effecting control of the respective controlled element;

a processor arranged so as to actuate the switches in response to data from the input terminals in accordance with a predetermined operating program;

a communications port connected to the communications bus for communication of data to and from the processor;

the operating program being stored independently in each of the control modules;

the operating program including a set of logic steps in an operating program format by which the switches are actuated in dependence upon predetermined characteristics of one or more of the input signals;

providing a personal computer having:

a communications port for communication with the processor through the communications port of the control module;

an operator interface for displaying data to the operator and for receiving commands from the operator;

providing a programming and diagnostic program in the personal computer;

on receipt of a command from the operator through the personal computer, causing one of the control modules to output the set of logic steps in operating program format to the personal computer;

causing the personal computer to receive and store the set of logic steps;

causing the personal computer using the programming and diagnostic program to convert the set of logic steps in operating program format stored in the personal computer from the operating program format into an operator viewable graphic display in ladder logic format and to display the graphic display of the logic steps on the operator interface;

causing the personal computer using the programming and diagnostic program to allow the operator to generate and/or modify the set of logic steps stored in the personal computer and viewed in the operator viewable graphic display;

and causing the personal computer using the programming and diagnostic program to convert the operator viewable graphic display of the generated logic steps into the operating program format and to transmit the generated logic steps in the operating program format to the control modules for storage therein.

* * * * *